C. B. KROGSTAD.
GARDEN TOOL.
APPLICATION FILED MAY 14, 1913.
1,147,027.
Patented July 20, 1915.
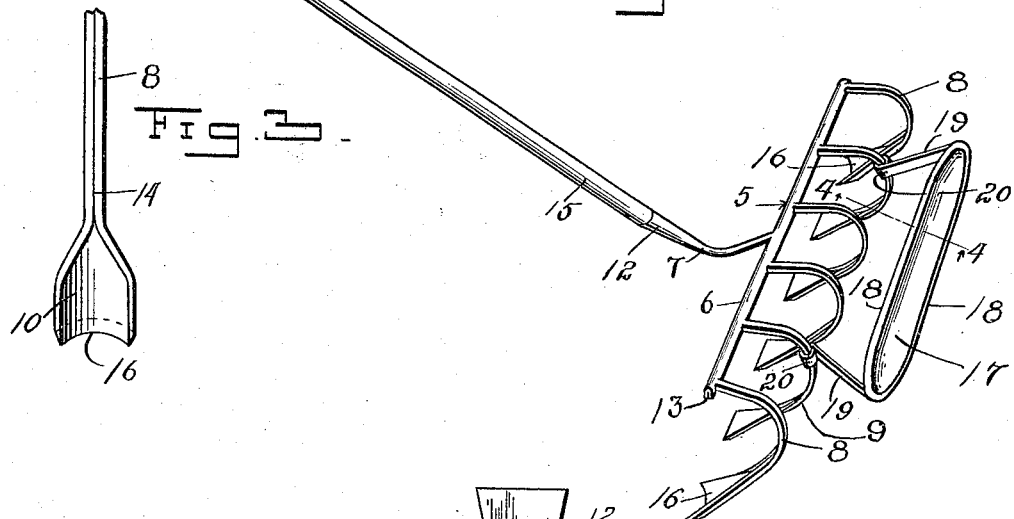
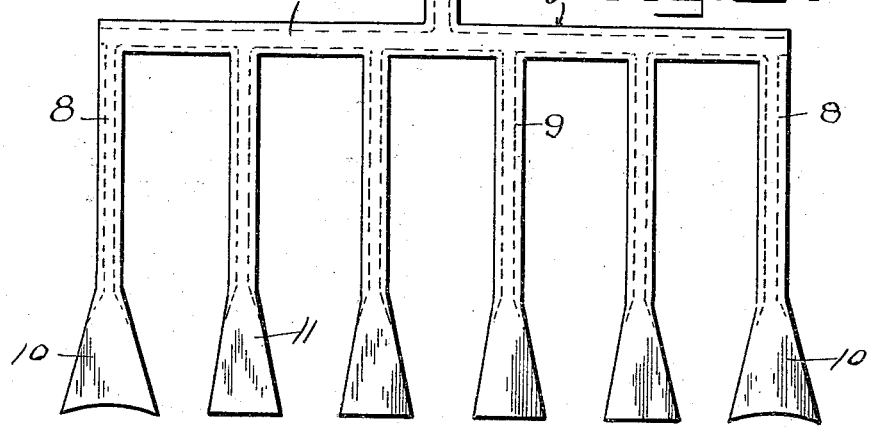

UNITED STATES PATENT OFFICE.

CARL B. KROGSTAD, OF PRINDLE, WASHINGTON.

GARDEN-TOOL.

1,147,027. Specification of Letters Patent. Patented July 20, 1915.

Application filed May 14, 1913. Serial No. 767,648.

*To all whom it may concern:*

Be it known that I, CARL B. KROGSTAD, a subject of the King of England, residing at Prindle, in the county of Skamania, State of Washington, have invented certain new and useful Improvements in Garden-Tools; and I do hereby declare the following to be a full, clear, and exact description of the invention, such as will enable others skilled in the art to which it appertains to make and use the same.

This invention relates to garden tools and it more particularly relates to an improved rake-like implement, adapted to be used by hand.

An object of the invention is to provide a tool of this character with which the growing crops in a field or garden may be quickly, easily and thoroughly cultivated by severing the weeds therefrom, and by stirring and pulverizing the soil at the same time.

Another object of the invention is to provide a tool of this character having teeth and a handle socket or connection which are properly related to each other for providing the proper inclination and relation of the teeth to the soil for accomplishing the most satisfactory results.

Another object is to provide a tool of this character having a series of alined cutting edges which are spaced apart, and which may be easily sharpened when necessary.

Another object is to provide a tool of this character having certain of its cutting blades formed with arcuate or concavo-convexed edges whereby the weeds are positively engaged, for cutting the latter.

Another object is to provide a tool or implement of this character which may be cheaply and economically constructed and which is strong, comparatively light, sufficiently resilient, and thoroughly efficient.

Other objects and advantages may be recited hereinafter and in the claim.

In the accompanying drawings, which supplement this specification; Figure 1 is a perspective view of my improved garden tool. Fig. 2 is a blank, stamped from sheet metal, from which my improved implement may be formed. Fig. 3 is an enlarged front elevation view of a fragment of one of the concavo-convexed cutting blades.

Referring to these drawings, in which similar reference characters correspond with similar parts throughout the several views; the rake-like body 5, which constitutes the principal element of my invention, consists of a head 6, a handle connection 7, outer or end blades or teeth 8, and the inner blades or teeth 9. This body may be formed from any suitable material or by any suitable means or process of manufacture, and one process which may be employed is described and illustrated as follows: A blank (see Fig. 2) may be stamped from relatively thick and ductile sheet metal, with widened or outwardly converging end portions 10, 11 and 12 respectively. This blank may then have its edges turned at right angles to its respective medial portions, along the dotted lines which are parallel to said edges, and after being thus bent, the several elements may be compressed or swaged into compact form, so that the parallel edges are brought together, as illustrated at 13 in Fig. 1 and at 14 in Fig. 3. These folded and swaged elements may then be raised, if desirable, for increasing the strength and rigidity of the tool. The outwardly converging element 12 may be forged flatter and wider, if desired, and then curved into conical form, so as to provide a socket for receiving the handle 15. The outwardly flared elements 10 are made concavo-convexed, and are each formed with a beveled and inwardly arcuate edge 16. The outwardly diverging ends 11 are also beveled, but they are not concaved or arcuate.

In operation, the user walks backward and pushes and pulls the tool back and forth over the surface of the ground, while holding the handle 15 at such an angle that the teeth or blades may enter to a greater or less depth, according to the attending circumstances, condition of the soil, etc. This fact that the user moves backward makes it possible to cultivate the ground while still moist or wet, as there is no tramping on the cultivated soil by the user. When it is desired to cut weeds in close proximity to the plants being cultivated, or to cut weeds which are in close proximity to a fence or wall, the inwardly curved cutting edges 16 will be found particularly useful and efficient.

It will be seen that I have provided a tool of this character which is fully capable of attaining the foregoing objects in a thoroughly practical and efficient manner.

I claim:

A rake like implement formed from a single blank of sheet metal comprising a head portion, teeth portions extending in parallel spaced relation from said head portion and consisting of shank portions having parallel edges and terminal portions having diverging edges, and a socket portion extending from said head portion in the opposite direction to said teeth portions and consisting of a shank portion having parallel edges and a terminal portion having diverging edges, the head portion of said blank being folded upon itself along its longitudinal median line, the shank portions of the teeth and socket portions of the blank being folded upon themselves to bring the edges together, the terminal portions of the teeth being left unfolded and the terminal portion of the socket being bent to form a hollow frusto-conical handle receiving socket.

In testimony whereof, I affix my signature, in the presence of two witnesses.

CARL B. KROGSTAD.

Witnesses:
ROBT. C. PRINDLE,
E. H. PRINDLE.